(12) United States Patent
Roberts

(10) Patent No.: US 10,701,933 B1
(45) Date of Patent: Jul. 7, 2020

(54) HIGH CONCENTRATE FOMESAFEN HERBICIDE FORMULATIONS

(71) Applicant: Helena Holding Company, Memphis, TN (US)

(72) Inventor: Johnnie R. Roberts, Arlington, TN (US)

(73) Assignee: Helena Agri-Enterprises, LLC, Collierville, TN (US)

( * ) Notice: Subject to any disclaimer, the term of this patent is extended or adjusted under 35 U.S.C. 154(b) by 0 days.

(21) Appl. No.: 15/262,683

(22) Filed: Sep. 12, 2016

Related U.S. Application Data

(63) Continuation of application No. 15/237,035, filed on Aug. 15, 2016, now abandoned.

(60) Provisional application No. 62/207,110, filed on Aug. 19, 2015.

(51) Int. Cl.
*A01N 41/06* (2006.01)
*A01N 57/20* (2006.01)
*A01N 37/22* (2006.01)
*C05G 3/60* (2020.01)
*A01N 25/30* (2006.01)

(52) U.S. Cl.
CPC ............. *A01N 41/06* (2013.01); *A01N 25/30* (2013.01)

(58) Field of Classification Search
CPC ........ A01N 41/06; A01N 37/22; A01N 57/20; A01N 25/30; C05G 3/02; C05G 3/60
See application file for complete search history.

(56) References Cited

U.S. PATENT DOCUMENTS

| 4,384,135 A | 5/1983 | Cartwright et al. | |
|---|---|---|---|
| 2002/0004457 A1* | 1/2002 | Nevill | A01N 61/00 504/138 |
| 2006/0252648 A1* | 11/2006 | Bell | A01N 25/02 504/359 |
| 2016/0143284 A1* | 5/2016 | Refsell | A01N 43/80 504/136 |

FOREIGN PATENT DOCUMENTS

| EP | 0003416 A1 | 8/1979 | | |
|---|---|---|---|---|
| WO | WO 2004021790 A1 * | 3/2004 | ............. | A01N 57/20 |
| WO | WO 2010100424 A1 * | 9/2010 | ............. | A01N 57/20 |
| WO | WO 2013134310 A1 * | 9/2013 | ............. | A01N 43/54 |

OTHER PUBLICATIONS

Fomesafen & Glyphosate Compatibility. Tank Mixing Recommendations [online]. Sharda USA, 2013 [retrieved on Feb. 6, 2017]. Retrieved from the Internet<URL:http://www.shardausa.com/announcements/2013-06-fomesafen-glyphosate-compatibility>, 2 pages.*
Sinister Product Label, [online]. Helena Chemical Company, Aug. 8, 2014 [retrieved on Nov. 9, 2017]. Retrieved from the Internet<http://www.kellysolutions.com/erenewals/documentsubmit/KellyData%5COK%5Cpesticide%5CProduct%20Label%5C5905%5C5905-593%5C5905-593_SINISTER_9_2_2014_9_01_13_AM.pdf>, 25 pages.*

* cited by examiner

*Primary Examiner* — John Pak
*Assistant Examiner* — Andriae M Holt
(74) *Attorney, Agent, or Firm* — Faegre Drinker Biddle & Reath LLP

(57) ABSTRACT

The invention relates to compositions containing the non-salt form of the herbicide fomesafen solubilized with at least one surfactant. Advantages provided by these compositions include higher active ingredient levels, improved cold temperature stability, and enhanced weed control performance.

4 Claims, No Drawings

HIGH CONCENTRATE FOMESAFEN HERBICIDE FORMULATIONS

RELATED APPLICATION

This application is a continuation application of U.S. application Ser. No. 15/237,035, filed Aug. 15, 2016, which is incorporated by reference. U.S. application Ser. No. 15/237,035 claims benefit to U.S. Provisional Application Ser. No. 62/207,110 filed Aug. 19, 2015 which is incorporated by reference in its entirety.

BACKGROUND OF THE INVENTION

Fluorine containing diphenyl ether derivatives with applications as herbicides were first disclosed in European Patent 3416 and U.S. Pat. No. 4,384,135 by Cartwright et. al. which are both incorporated by reference in their entirety for all useful purposes. One of the more useful compounds that came out of this discovery is 5-[2-chloro-4-(trifluoromethyl) phenoxy]-N-methylsulfonyl-2-nitrobenzamide, which carries the common name fomesafen. Fomesafen is used in a number of commercially available products either alone or in combinations with other herbicides. Fomesafen has the following chemical formula:

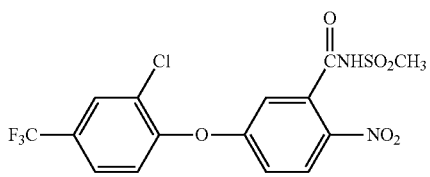

Recently there has been renewed research and additional applications for fomesafen due to its usefulness as a tool for managing weeds that have developed resistance to other herbicides. Enhancing the weed control efficacy and ease of application of fomesafen are desirable goals for this herbicide and are met with a number of difficulties and limitations. One difficulty that must be overcome is the poor water solubility of fomesafen. Fomesafen has a water solubility of only 50 mg/liter. This makes the preparation of concentrated water solutions that can be further diluted by the end user impractical. Fomesafen exhibits significantly greater solubility in organic solvents such as acetone, xylene, methylene chloride, and methanol. However, the flammability and/or toxicity of these solvents make them unsuitable for the preparation of concentrates. The most cost efficient way to address this limitation is to convert the fomesafen into a water soluble salt by reacting it with either sodium hydroxide or potassium hydroxide. This makes possible the preparation of water based formulations of the salt form of fomesafen up to 22.8% (21.7% fomesafen acid equivalent). While it is possible to increase the concentration of fomesafen salt in water to levels higher than 22.8%, such formulations become unstable in colder temperatures and are not practical for commercial use. In addition, pH of these compositions must be maintained at levels of 7.5 or higher. These alkaline pH ranges can have a negative impact on the weed control performance of both the fomesafen and other herbicides that are jointly applied with it. It is also established that the current commercial salt formulations of fomesafen have physical compatibility problems with other herbicides and fertilizers that are mixed with it.

SUMMARY OF THE INVENTION

We have surprisingly discovered that it is now possible to prepare concentrated solutions of fomesafen in the non-salt form. This water solubilized fomesafen may in turn be used to produce novel herbicide formulations that address the limitations of conventional fomesafen salt formulations that are now used commercially. Cold temperature stable concentrates of fomesafen up to 40% by weight can be produced by this invention. This means that it is now possible to produce fomesafen formulations that deliver significantly more active ingredient than the current commercial products. This in turn provides consumers the advantages of reduced application rates, storage, handling, and costs.

We have also found that the formulations resulting from this invention provide superior compatibility and weed control with mixed and applied jointly with other herbicide products such as glyphosate and paraquat. These advantages may reduce or eliminate the need to add other components to the spray application (such as, but not limited to, adjuvants) for this purpose. The mild pH ranges possible for this composition (pH 6.0-7.5) also reduce the potential for eye irritation. Additional applications for this invention include novel formulations in combination with other herbicides such as, but not limited to, glyphosate, metolachlor, S-metolachlor, and acetochlor.

DETAILED DESCRIPTION OF THE INVENTION

The preparation of concentrated non-salt formulations of fomesafen is accomplished by solubilizing this herbicide in surfactants rather than in solvents or water. Examples of some preferred surfactant categories that can be used in these compositions include cationic, non-ionic, anionic and amphoteric surfactants. More specific types of preferred surfactants include non-ionic linear or branched alcohol ethoxylated surfactants, anionic phosphoric acid ester surfactants (also referred to as phosphate ester surfactants), and cationic ethoxylated tallow amine surfactants. Examples of more specific surfactants that could be used to practice this invention include but are not limited to:

Alcohol alkoxylates including, but limited to:
    Branched or linear;
    Those containing ethylene oxide or propylene oxide;
Alcohol alkoxylate sulfates;
Alkylphenol alkoxylates including, but not limited to:
    Nonylphenol and octylphenol;
    Those containing ethylene oxide or propylene oxide;
Alkylaryl sulfonates;
Amine oxides;
Amines including, but not limited to:
    Fatty amine alkoxylates such as tallowamine alkoxylates;
Betaine derivatives;
Carboxylated alcohols;
Ethoxylated amines;
Ethoxylated fatty acids;
Ethoxylated fatty esters and oils;
Fatty esters;
Glycerol esters;
Phosphate ester surfactants including, but not limited to:
    Phosphate esters of alcohol alkoxylates;
    Phosphate esters of alkylphenol alkoxylates;
Sarcosine derivatives;
Silicone-based surfactants;
Sorbitan derivatives including, but not limited to:
    Sorbitan esters;

Alkoxylated sorbitan esters;
Sucrose and glucose derivatives including, but not limited to:
  Alkylpolyglucosides;
Sulfates and sulfonates of alkoxylated alkylphenols;
Sulfates of alcohols;
Tristyrylphenol Alkoxylates;
Polyethoxylated aliphatic phenols;
Polymers of ethylene or propylene oxides; or
Ethoxylated triglycerides and ethoxylated seed oils.

Other surfactants as disclosed in McCutcheon's Emulsifiers and Detergents, North American Edition, 2015 (McCutcheon) which is incorporated by reference.

The disclosed composition required to practice this invention comprise of 1-50% preferably 10-40% and more preferably 20-30% of the herbicide fomesafen in the non-salt form solubilized with 1-70% and preferably 20-50% by weight and most preferably 30-40% by weight with surfactants. Once solubilized, water may be added as diluent.

The pH of this composition should be in the range of 2.0-7.5 with the preferred range being 6.5-7.0. Acidic compounds may be used to lower the pH into the preferred range. These include, but are not limited to: acetic acid, lactic acid, maleic acid, succinic acid, sulfuric acid, hydrochloric acid, phosphoric acid, or nitric acid. Alkaline compounds may be used to raise the pH into the preferred range. These include, but are not limited to: diethanolamine, monoethanolamine, sodium hydroxide, potassium hydroxide, or aliphatic alkyl amine derivatives.

The composition(s) disclosed may be used in the range of 0.05-10.0% and preferably 0.125-5.00% and most preferably 0.25-2.50% by weight in a water and/or fertilizer based spray mixtures. These spray mixtures may also contain other herbicides as well as fungicides, insecticides, plant growth regulators, or plant nutritional products. The following is a list of herbicides, fungicides, insecticides, plant regulators, plant nutritional products that can be used according to the invention include, but are not limited to:
Accord Concentrate,
Accord XRT II,
Authority First DF,
Authority XL,
Avaris,
Axilo BZM,
Axilo Mix 5,
Axilo Mn,
Cadet,
Classic,
Cobalt,
Cobra,
CoRoN 10-0-10 B,
CoRoN Full Bor,
CoRoN 25-0-0-0.5B,
Durango DMA,
ENC,
First Rate,
Fusilade DX,
Gly Star Gold,
Glyfos Original,
Glyfos Xtra,
Glystar Plus,
Glytrel MnP,
Gramoxone,
Halex GT,
Headline AMP,
Headline EC,
Headline SC,
Honcho Plus,
Hoss Ultra,
Kickstand MN,
K-Leaf,
Leverage 2.7,
Leverage 360,
Liberty 280 SL,
Marvel,
Megafol,
Nucleus 0-0-15,
Paraquat Firestorm,
Pendimethalin,
Powermax,
Prowl H2O,
Quadris Top,
Quilt Xcel,
Resource,
Rodeo,
Select Max,
Showdown,
Stratego YLD,
TapOut,
Tempest,
Touchdown CT2,
Touchdown Total SL,
Traxion SL,
Utilize, or
Viathon.

| Product | Type | Active Ingredient(s) | Fomesafen specific language | Broad herbicide tank mix language |
|---|---|---|---|---|
| Accord Concentrate | herbicide | glyphosate | none | This product may be used in tank mix combination with other herbicide products to broaden the spectrum of vegetation controlled. |
| Accord XRT 11 | herbicide | glyphosate | none | For residual weed control or to broaden the weed control spectrum, tank mix this product with other herbicides. |
| Authority First DF | herbicide | cloransulam-methyl, sulfentrazone | none | Authority First DF Herbicide may be applied alone or in tank mix combination with other herbicides registered for.. .application to soybeans. |
| Authority XL | herbicide | clorimuron ethyl, sulfentrazone | none | Authority XL may be applied alone or in tank mix combinations with other registered soybean herbicides. |
| Avaris | fungicide | azoxystrobin, propiconazole | none | Avaris may be applied as a foliar spray in alternating spray programs or in tank mixes with other crop protection products. |
| Axilo BZM | nutritional | Mn, Zn, B, Mo | none | Axilo BZM is compatible with a wide range of fertilizers and pesticides...Can form a stable mixture with glyphosate, other pesticides and foliar |

-continued

| Product | Type | Active Ingredient(s) | Fomesafen specific language | Broad herbicide tank mix language |
|---|---|---|---|---|
| Axilo Mix 5 | nutritional | Fe, Mn, Mg, Cu, Zn, B, Mo | none | fertilizers. Axilo Mix 5 is compatible with a wide range of fertilizers and pesticides... |
| Axilo Mn | nutritional | Mn | none | Axilo Mn is compatible with a wide range of fertilizers and pesticides... |
| Cadet | herbicide | fluthiacet-methyl | none | Cadet is compatible with most commonly used herbicides, insecticides, fungicides, and spray adjuvants. |
| Classic | herbicide | mcpa, 2,4-D, Dicamba | CLASSIC ® may be tank mixed with: 0.75-1.25 pt/acre "Flexstar" 0.75-1.5 pt/acre "Reflex" ... | |
| Cobalt | insecticide | chlorpyrifos, gamma, cyhalothrin | none | Cobalt Advanced is compatible with insecticides, herbicides, miticides, and fungicides and non-pressure fertilizer solutions commonly used except for alkaline materials... |
| Cobra | herbicide | lactofen | TO DELAY HERBICIDE RESISTANCE Avoid the use of herbicides that have a similar target site mode of action in consecutive years. Other Group 14 herbicides (PPO inhibitors) include acifluorfen (Ultra Blazer ®) and fomesafen (Flexstar ®, Reflex ®). | |
| CoRoN 10-0-10 B | nutritional | Cl, N, Potash, B | none | none |
| CoRoN Full Bor | nutritional | N, B | none | Coron Full Bor is compatible with most pesticides and other fertilizers... |
| CoRoN 25-0-0- 0.5B | nutritional | N, B | none | none |
| Durango DMA | herbicide | glyphosate | To control emerged weeds as a postemergence application, apply this product in a tank mix with ... fomesafen (Flexstar) to control emerged Amaranthys spp... To control emerged ragweed species, apply this product in a tank mix with ... fomesafen (Flexstar). | |
| ENC | nutritional | Potash, Phosphate, N, Cl, Fe, Cu, Mn, Zn, B, Mo, Co | none | Ele-Max Nutriend Concentrate is compatible with most fungicides, insecticides and herbicides... |
| First Rate | herbicide | cloransulam-methyl | Tank Mix Options: For weeds not listed for postemergence control with FirstRate, the herbicides listed below may be used per label instructions: Flexstar, Reflex | |
| Fusilade DX | herbicide | fluazifop-p-butyl | Tank Mix Options: For weeds not listed for postemergence control with FirstRate, the herbicides listed below may be used per label instructions: Flexstar, Reflex | |
| Gly Star Gold | herbicide | glyphosate | Soybeans Refer to table below for tank mixtures that may be applied before, during or after planting in conventional tillage systems, into a cover crop, established sod or in previous crop residue. TANK MIXES: Flexstar, Reflex | |
| Glyfos Original | herbicide | glyphosate | none | none |
| Glyfos Xtra | herbicide | glyphosate | none | none |
| Glystar Plus | herbicide | glyphosate | Soybeans Refer to table below for tank mixtures that may be applied before, during or after planting in conventional tillage systems, into a cover crop, established sod or in previous crop residue. TANK MIXES: Flexstar, Reflex | |
| Glytrel MnP | nutritional | Mn, phosphate | none | none |
| Gramoxone | herbicide | paraquat | Gramoxone SL may be tank mixed with the following herbicides:... Flexstar. | |
| Halex GT | herbicide | s-matolachlor, glyphosate, mesotrione | none | none |
| Headline AMP | fungicide | metconazole, pyraclostrobin | none | none |
| Headline EC | fungicide | pyraclostrobin | none | Headline fungicide can be tank mixec with most recommended fungicides, insecticides, herbicides, liquid fertilizers, biological control products, adjuvants, and additives as specified in table 2. |

-continued

| Product | Type | Active Ingredient(s) | Fomesafen specific language | Broad herbicide tank mix language |
|---|---|---|---|---|
| Headline SC | fungicide | pyraclostrobin | none | Headline SC fungicide can be tank mixed with most recommended fungicides, insecticides, herbicides, liquid fertilizers, biological control products, adjuvants, and additives as specified in table 2. |
| Honcho Plus | herbicide | glyphosate | This product may also be tank-mixed with the following products ...Flexstar, Reflex | |
| Hoss Ultra | herbicide | glyphosate | none | none |
| Kickstand MN | nutritional | Mn | none | none |
| K-Leaf | nutritional | Potash | none | none |
| Leverage 2.7 | insecticide | imidaclopird, cyfluthrin | none | Leverage 2.7 may be combined with foliar-applied fungicides, herbicides and insecticides/miticides. |
| Leverage 360 | insecticide | imidaclopird, cyfluthrin | none | Leverage 360 Insecticide may be combined with foliar-applied fungicides, herbicides and insecticides/miticides. |
| Liberty 280 SL | herbicide | glufosinate | TANKM1X PARTNER FOR LIBERTY 280 SL HERBICIDE IN LIBERTYLINK SOYBEANS Flexstar, Reflex | |
| Marvel | herbicide | fomesafen, fluthiacet-methyl | none | Marvel Herbicide is compatible with most commonly used herbicides, insecticides, fungicides, and spray adjuvants. |
| Megafol | nutritional | Potash, N | none | Megafol can be tank mixed with pesticides, fertilizers or other chemicals. |
| Nucleus 0-0-15 | nutritional | Potash, Cl | none | none |
| Paraquat Firestorm | herbicide | paraquat | Improved Control of Perennial and Annual Broadleaf Weeds Tank mixing with ...Reflex Herbicide will help improve control when perennial broadleaf weeds such as Canada thistle, bindweed, dandelion, etc., or difficult to control annual broadleaf weeds such as giant ragweed or morningglory are present. | |
| Pendimethalin | herbicide | pendimethalin | none | Helena Pendimethalin should be tank mixed or followed by a postemergence herbicide application. |
| Powermax | herbicide | glyphosate | This product may also be tank- mixed with thefollowing products ...Flexstar, Reflex, fomesafen | |
| Prowl H2O | herbicide | pendimethalin | none | Prowl H2O should be tank mixed or followed by a postemergence herbicide application. |
| Quadris Top | fungicide | azoxystrobin, difenconazole | none | none |
| Quilt Xcel | fungicide | azoxystrobin, propiconazole | none | Quilt Xcel may be applied as a foliar spray in alternating spray programs or in tank mixes with other crop protection products. |
| Resource | herbicide | flumicloracm pentyl ester | Approved tank mixes are indicated in Table 5...Flexstar | |
| Rodeo | herbicide | glyphosate | none | For residual weed control or an alternate mode of action, tank mix this product with other herbicides. |
| Select Max | herbicide | clethodim | Table 10. SELECT MAX TANK MIXES WITH BROADLEAF HERBICIDES...Flexstar HL... | |
| Showdown | herbicide | glyphosate | none | Showdown may be applied in combination with any herbicide registered for the same site, timing, and method of application. |
| Stratego YLD | fungicide | trifloxystrobin, prothio-conazole | none | none |
| TapOut | herbicide | clethodim | Table 10. TAPOUT TANK MIXES WITH BROADLEAF HERBICIDES...Flexstar HL... | |
| Tempest | insecticide | bifenthrin, imidacloprid | none | Tempest Dual-Action Insecticide may be applied inon tank mixtures with other products approved for use registered crops. |
| Touchdown CT2 | herbicide | glyphosate | Touchdown CT2 can be tank mixed with the following products:... Flexstar, Reflex | |
| Touchdown Total SL | herbicide | glyphosate | Touchdown Total can be tank mixed with the following products:...Flexstar, Reflex | |
| Traxion SL | herbicide | glyphosate | Traxion can be tank mixed with the following products:... Flexstar, Reflex | |
| Utilize | nutritional | N | none | none |
| Viathon | fungicide | Potassium phosphite, tebuconazole | none | none |

The invention is applicable to all non-salt based fomesafen herbicides used in both agricultural and non-agricultural applications. Non-agricultural applications would include use in forestry, vegetation management, aquatics, ornamentals, turf, and home pest control.

Fertilizers include products and applications of nitrogen, potassium, phosphorous, sulfur, calcium, magnesium, zinc, manganese, chloride, boron, and iron.

The composition(s) disclosed may be used in the range of 0.05-5.0% of water based spray.

I claim:

1. A soluble composition consisting essentially of 10 to 60% by weight fomesafen herbicide in a non-salt form and solubilized with at least one surfactant in an amount of at least 20% by weight, and the balance water,
    wherein the at least one surfactant consists essentially of fatty amine alkoxylate, and
    wherein the composition is adjusted to a pH range of 2.0-7.5.

2. The composition as claimed in claim 1, wherein the composition is diluted in water or fertilizer at the range of 0.05-10.0%.

3. The composition as claimed in claim 1, wherein the at one surfactant is present in an amount of at least 30% by weight.

4. The composition as claimed in claim 1, wherein the fatty amine alkoxylate is an ethoxylated tallow amine.

* * * * *